United States Patent
Li et al.

(10) Patent No.: US 8,605,943 B2
(45) Date of Patent: Dec. 10, 2013

(54) METHOD AND DEVICE FOR DETERMINING LEAN ANGLE OF BODY AND POSE ESTIMATION METHOD AND DEVICE

(75) Inventors: Liang Li, Beijing (CN); Weiguo Wu, Beijing (CN)

(73) Assignee: Sony Corporation, Tokyo (JP)

(*) Notice: Subject to any disclaimer, the term of this patent is extended or adjusted under 35 U.S.C. 154(b) by 358 days.

(21) Appl. No.: 12/986,418

(22) Filed: Jan. 7, 2011

(65) Prior Publication Data

US 2011/0164788 A1 Jul. 7, 2011

(30) Foreign Application Priority Data

Jan. 7, 2010 (CN) .......................... 2010 1 0002336

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

| | | | | |
|---|---|---|---|---|
| 5,881,171 | A * | 3/1999 | Kinjo | 382/199 |
| 2002/0031246 | A1* | 3/2002 | Kawano | 382/132 |
| 2004/0101192 | A1* | 5/2004 | Yokoyama | 382/153 |
| 2005/0031166 | A1* | 2/2005 | Fujimura et al. | 382/103 |
| 2005/0232467 | A1* | 10/2005 | Mohri et al. | 382/103 |
| 2007/0014473 | A1* | 1/2007 | Slabaugh et al. | 382/173 |
| 2007/0165931 | A1* | 7/2007 | Higaki | 382/128 |
| 2009/0022398 | A1* | 1/2009 | Ishikawa et al. | 382/181 |
| 2009/0080780 | A1* | 3/2009 | Ikeda | 382/209 |
| 2009/0322888 | A1* | 12/2009 | Wuerz-Wessel et al. | 348/207.11 |

OTHER PUBLICATIONS

Surya Prakash; R. Abhilash; Sukhendu Das, "SnakeCut: An Integrated Approach Based on Active Contour and GrabCut for Automatic Foreground Object Segmentation", 2007, Electronic Letters on Computer Vision and Image Analysis (ELCVIA), vol. 6, pp. 13-29.*
C. Hilario; J.M. Collado; J. M. Armingol; A. De la Escalera, "Pedestrian detection for intelligent vehicles based on active contour models and stereo vision", Feb. 2005, in Proceedings of 10th International conference on Computer Aided Systems Theory, pp. 537-542.*

* cited by examiner

*Primary Examiner* — David Zarka
*Assistant Examiner* — Carol Wang
(74) *Attorney, Agent, or Firm* — Oblon, Spivak, McClelland, Maier & Neustadt, L.L.P.

(57) ABSTRACT

Provided are a method and device for determining a lean angle of a body and a pose estimation method and device. The method for determining a lean angle of a body of the present invention includes: a head-position obtaining step for obtaining a position of a head; a search region determination step for determining a plurality of search region spaced with an angle around the head; an energy function calculating step for calculating a value of an energy function for the search region; and a lean angle determining step for determining the lean angle of a search region with a largest or smallest value of the energy function as the lean angle of the body. The pose estimation method of the present invention includes a body lean-angle obtaining step, for obtaining a lean angle of a body; and a pose estimation step, for performing a pose estimation based on the lean angle of the body.

17 Claims, 7 Drawing Sheets

METHOD AND DEVICE FOR DETERMINING LEAN ANGLE OF BODY AND POSE ESTIMATION METHOD AND DEVICE

FIELD OF THE INVENTION

The present invention generally relates to the field of computer, and in particular, to a pose estimation in an image or video. More particularly, the present invention relates to a method and device for determining a lean angle of a body and a pose estimation method and device.

BACKGROUND OF THE INVENTION

The pose estimation from a two-dimensional image is a hot topic in the field of computer. The pose estimation technology may be applied in many fields such as human-computer interaction, video monitoring and analysis of digital information.

In principal, the pose estimation technology may be classified as the pose estimation method based on model and the pose estimation method based on learning.

In the pose estimation method based on model, a body model constituting by body parts is created and the pose estimation is implemented by searching and matching the closest pose in a searching space with the body model. For example, J. M. Rehg and T. Kanade proposed a pose estimation method based on model in "Model-based tracking of selfoccluding articulated objects" (see, ICCV, page 612-617, 1995). Mun Wai Lee and Cohen proposed a pose estimation method based on model in "A model-based approach for estimating human 3D poses in static images" (see, IEEE TPAMI 28(6):905-916). The above-mentioned documents are incorporated herein by reference in their entirety.

In the pose estimation technology based on learning, the pose of the object is derived from image features of the object and the most used image feature is the contour information of the object. In order to obtain the contour information, the motion analysis method, the background modeling method or the combination thereof is used. For example, A. Agarwal and B. Triggs proposed a method for deriving a 3D pose based on the contour information of the objection in "3d human pose from silhouettes by relevance vector regression" (see, CVPR, vol 2:pp. 882-888, 2004) in which the contour information is obtained with the motion analysis method. R. Rosales and S. Sclaroff proposed a method for deriving a 3D pose based on the contour information of the objection in "Learning body pose via specialized maps" (see, NIPS, 2002) in which the contour information is obtained with the background modeling method. The above-mentioned documents are incorporated herein by reference in their entirety.

In current pose estimation technologies, the estimation for the body is a key part of the pose estimation.

SUMMARY OF THE INVENTION

The following summary is a brief description of the present application so as to provide basic understanding of some aspects of the present application. It shall be understood that, the summary is not exhaustive and does not intend to limit key concepts or important aspects of the present application or define the scope of the present application. The summary only intends to provide some concept in a simple manner as a preamble of detailed embodiments as below.

An object of the present invention is to provide a method and device for determining a lean angle of a body.

Another object of the present invention is to provide a pose estimation method and device.

Another object of the present invention is to provide machine-executable instructions which, when executed by an information processing device, causes the information processing device to perform the method described above, a computer readable storage medium storing the machine-executable instructions and a program product including the machine-executable instructions.

In order to achieve the above objects, an aspect of the present invention provides a method for determining a lean angle of a body, including: a head-position obtaining step for obtaining a position of a head; a search region determination step for determining a plurality of search region spaced with an angle around the head; an energy function calculating step for calculating a value of an energy function for each search region; and a lean angle determining step for determining the lean angle of a search region with a largest or smallest value of the energy function as the lean angle of the body.

Another aspect of the present invention provides a device for determining a lean angle of a body, including: a head-position obtaining means adapted to obtain a position of a head; a search region determination means adapted to determine a plurality of search region spaced with an angle around the head; an energy function calculating means adapted to calculate a value of an energy function for the search region; and a lean angle determining means adapted to determine the lean angle of a search region with a largest or smallest value of the energy function as the lean angle of the body.

By using the above the method and device for determining a lean angle of a body, the lean angle of body can be obtained in an image.

In addition, another aspect of the present invention further provides a pose estimation method, including: a body lean-angle obtaining step, for obtaining a lean angle of a body; and a pose estimation step, for performing a pose estimation based on the lean angle of the body.

Another aspect of the present invention further provides a pose estimation device, including: a body lean-angle obtaining means adapted to obtain a lean angle of a body; and a pose estimation means adapted to perform a pose estimation based on the lean angle of the body.

By using the above pose estimation method and pose estimation device, the pose estimation is implemented based on the lean angle of the body in the image.

Another aspect of the present invention further provides corresponding machine-executable instructions, computer readable storage medium storing the machine-executable instructions and program product including the machine-executable instructions.

The invention will now be further illustrated in conjunction with the drawings and embodiments of the invention hereinafter.

BRIEF DESCRIPTION OF THE DRAWINGS

The present invention may be better understood by referring to the description hereinafter in combination with the drawings, wherein in the drawings, the same or similar reference signs are used to indicate the same or similar components. All the drawings and the detailed description are included in the specification and constitute a part of the specification, and are used to further present examples to illustrate the preferred embodiments of the invention and explain the principles and advantages of the invention. Wherein:

FIG. 2b shows an image obtained after the distance transforming process to the mask image shown in FIG. 2a;

DETAILED DESCRIPTION OF THE EMBODIMENTS

Figure 1:
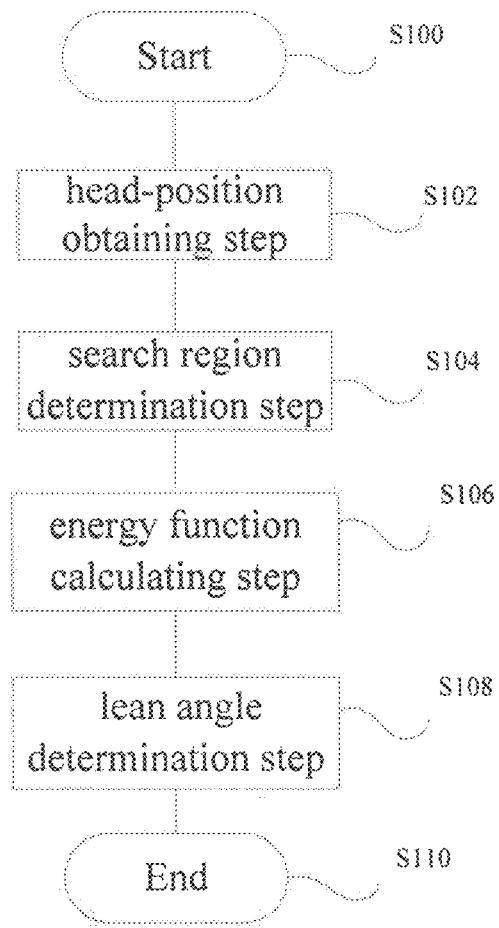
FIG. 1 shows the flow chart of the method for determining a lean angle of a body according to an embodiment of the present invention.

Hereinafter, the embodiments of the present invention will be described in combination with the drawings. In view of clearness and conciseness, not all the features of the practical embodiments are described in the description. However, it should be understood that many decisions specific to the embodiments need to be made during the development of any practical embodiments, so as to achieve the specific objects of the developer, and these decisions may vary to some extent according to different embodiments. Further, it should be understood that although the developing work may be rather complicated and time-consuming, it is only a routine job for those skilled in the art who benefit from the disclosure of the present invention.

It should be further pointed out here that in the drawings, only the device structure closely related to the solution of the present invention is illustrated in the drawings, and other details having little relation with the present invention is omitted, so as to avoid making the present invention unclear due to unnecessary details.

An embodiment of the present invention provides a method for determining a lean angle of a body. In the method, a head-position obtaining step is performed to an input image from an image or a video for obtaining a position of a head; a plurality of search region spaced with an angle is determined around the head; a value of an energy function is calculated for each search region; the lean angle of a search region with a largest or smallest value of the energy function is determined as the lean angle of the body.

FIG. 1 shows the flow chart of the method for determining a lean angle of a body according to an embodiment of the present invention.

The method starts at step S100.

Then, at step S102, a head-position obtaining step is performed to obtain a head position in the image.

There are various method for obtaining the head position. For example, the head position may be input directly, or, the head position may be obtained via a head recognition process.

The head recognition process may be implemented in various manners. For example, in a preferable embodiment of the present invention, the head recognition process may be implemented by detecting face. In another preferable embodiment of the present invention, the head recognition process may be implemented based on a method for locating the head. In addition, the head position may also be determined by detecting face feature (such as eyes, mouse, and nose).

Figure 2A:
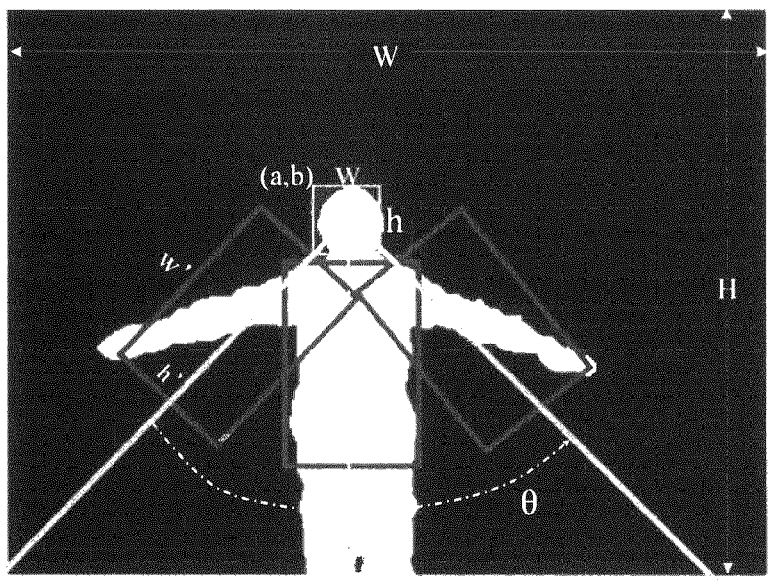
FIG. 2a shows a mask image M (x, y) in which the search regions determined at the search region determination step are shown.

FIG. 2a shows a mask image M (x, y) in which the search regions determined by the search region determination step are shown.

Referring back to FIG. 1, at step S104, a search region determination step is performed so as to determine a plurality of search region. Particularly, the search region determination step includes determining a plurality of search region around the head and thus obtaining a search region sequence. Preferably, as shown in FIG. 2a, the determined search region is rectangle box, however, the present invention is not limited thereto, the search region may also be other suitable shape, such as round and oval.

FIG. 2a shows the search regions determined by the search region determination step. As shown in FIG. 2a, after the search region determination step, in a sector region around the head (for example, in FIG. 2, the rectangle box (a, b, w, h)), regions with a predetermined area and spaced with an angle $\Delta$ are determined as the search regions (for example, in FIG. 2, the search region is a rectangle box with the width of w' and the height of h'). Thus, the search region sequence $\{S|S_i, i=1, 2, \ldots, N\}$ is obtained, in which i represents the sequence number of the search region in the search region sequence and N represents the number of the search regions in the sequence.

In addition, the values of $\theta$, $\Delta$, w', h' may be configured according to different conditions. In a preferable embodiment of the present invention, it is configured that: w'=3×w, h'=4.5×h, $\theta$=120°, $\Delta$=3°, N=40.

Referring to FIG. 1, at step S106, an energy function calculating step is performed. In particular, a value of an energy function is calculated for each search region based on one or more image features.

In principle, the energy function represents the possibility that the search region is the body. The energy function may be constituted with one or more image features of the input image with any suitable manner. For example, the energy function may be so configured that the higher the value of the energy function of the search region is, the higher the possibility that the search region corresponds to the body is. Alternatively, the energy function may also be so configured that the lower the value of the energy function of the search region is, the higher the possibility that the search region corresponds to the body is.

The energy function may be constituted with various image features. In a preferable embodiment of the present invention, the energy function may be constituted with coverage feature, edge feature and symmetry feature.

Figure 3:
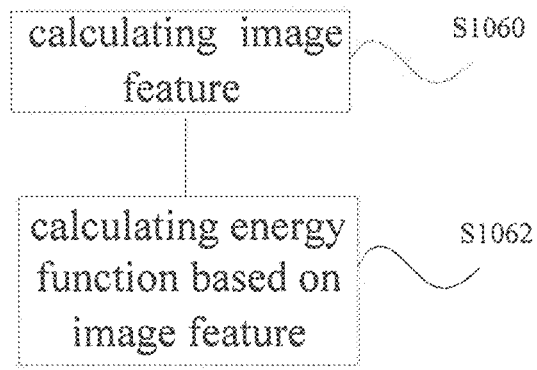
FIG. 3 shows a flow chart for calculating the energy function.

As shown in FIG. 3, the energy function calculating step 106 may includes a step 1060 for calculating one or more image feature and a step 1062 for calculating the energy function based on the one or more image feature. It shall be noted that, in the case that the energy function only relates to one image feature, the step 1062 for calculating the energy function based on the image feature is simplified as a process for considering the image feature as the energy function and the energy function calculating step 106 only includes the step 1060 for calculating the image feature.

At step S1060, one or more image feature may be calculated to construct the energy function. As for the calculation of the image feature, the following description will be given with the calculation of the coverage feature, the edge feature and the symmetry feature as an example.

1. Calculation of the Coverage Feature

In principle, the coverage feature represents the proportion of the pixels of body (i.e. foreground pixels) in the search region.

The coverage feature may be constituted in any suitable manner. In an embodiment of the present invention, the coverage feature may be constituted according to the area of the search region and the amount of the foreground pixels in the search region.

There are many known methods, such as a motion analysis method, a background modeling method or the combination thereof, for distinguishing the background pixel and the foreground pixel. For example, A. Agarwal and B. Triggs proposed a motion analysis method for distinguishing the background pixel and the foreground pixel in "3d human pose from silhouettes by relevance vector regression" and R. Rosales and S. Sclaroff proposed a background modeling method for distinguishing the background pixel and the foreground pixel in "Learning body pose via specialized maps". The above-mentioned documents are incorporated herein by reference in their entirety.

Any suitable method may be used to obtain the amount of the foreground pixels in the search region. For example, the amount of the foreground pixels in the search region may be obtained by counting the foreground pixels in the search region after distinguishing the background pixel and the foreground pixel. As another example, the amount of the foreground pixels in the search region may be obtained with a mask image.

The mask image is an image obtained by performing a binarization process to an input image according to the foreground pixel and the background pixel. Particularly, in the mask image, the mask value of the pixel which is the foreground is set to 1 and the mask value of the pixel which is the background is set to 0.

FIG. 2*a* shows a mask image thus obtained.

After the mask image is obtained, the coverage feature may be obtained according to the mask value of the mask image and the area of the search region.

For example, in the case that the search region is a rectangle box, the coverage feature $M'_{Si}$ of the i-th search box may be defined according to the sum of the mask value in the search box and the area of the search box, as shown in formula (1):

$$M'_{Si} = \frac{\sum_{(x,y) \in Si} M(x,y)}{w' * h'} \quad (1)$$

In formula (1), $M'_{Si}$ represents the coverage feature of the i-th search region $S_i$, w' and h' represent the width and the height of the rectangle search box respectively, x and y represent the horizontal coordinate and the vertical coordinate of the pixel, and M (x,y) represents the mask value of the pixel (x,y).

In the case of the coverage feature as shown in formula (1), the more the portion of foreground in the search box is i.e. the higher the sum of the mask value is, the higher the value of the coverage feature $M'_{Si}$ is.

The coverage feature as shown in formula (1) is merely an example and the present invention is not limited thereto. The coverage feature may also be constituted in other manners. For example, the coverage feature may also be so configured that: the more the portion of foreground in the search region is, the lower the value of the coverage feature $M'_{Si}$ is.

Figure 4:
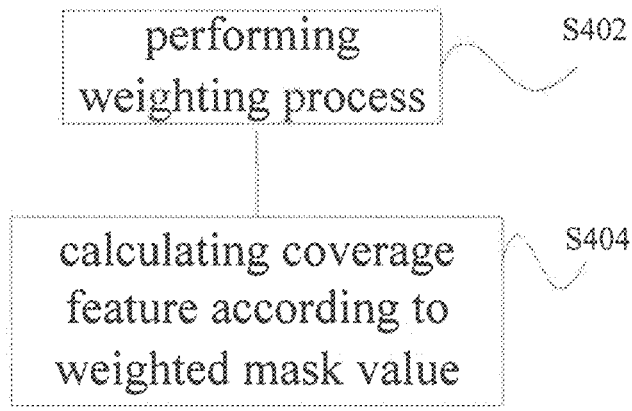
FIG. 4 shows a flow chart for calculating the coverage feature according to an embodiment of the present invention.

In another preferable embodiment, during constituting the coverage feature, in addition to the amount of the foreground pixels in the search region and the area of the search region, the possibility that the pixel is a foreground pixel may be further considered. In particular, the mask value of the image may be weighted based on the possibility that the pixel is the foreground pixel FIG. 4 shows a flow chart for calculating the coverage feature according to an embodiment of the present invention. As shown in FIG. 4, the calculation of the coverage feature includes a step S402 for performing a weighting process and a step S404 for calculating the coverage feature according to the weighted mask value.

As shown in FIG. 4, the weighting process is performed at step S402. There are various methods for performing the weighting process. For example, the mask value of a pixel may be weighted according to a distance between the pixel and the boundary of the foreground and the background (i.e. the boundary of the pixels with mask value of 1 and the pixels with the mask value of 0). Particularly, in the weighting process also called as distance transform, a linear weighting is performed to a mask value of pixel according to the vertical distance between the pixel and the boundary of the foreground and the background (i.e. the boundary of the pixels with mask value of 1 and the pixels with the mask value of 0). In the linear weighting, the weight is in linear proportion to the distance. Alternatively, a non-linear weighting in which the weight is not in linear proportion to the distance may also be used.

Figure 2B:
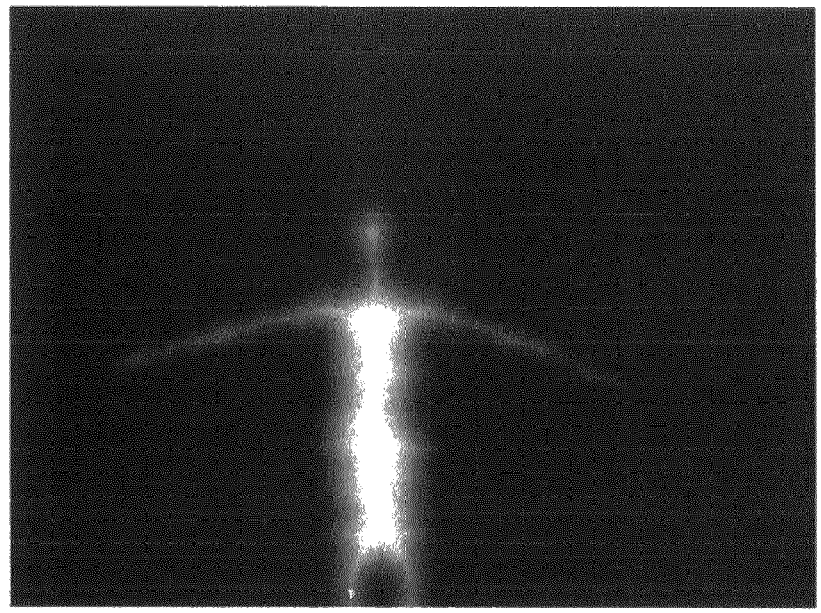

FIG. 2*b* shows an image obtained after the distance transforming process to the mask image shown in FIG. 2*a*. In FIG. 2*b*, a linear weighting is performed to the mask value according to the vertical distance between the pixel and the boundary of the foreground and the background. As can be seen from FIG. 2*b*, the image after the distance transforming process shows the trunk and the limb of the body more clearly.

After the weighting process to the mask image, at step S404, the coverage feature is calculated according to the weighted mask value.

For example, in the rectangle search box as shown in FIG. 2*a*, the coverage feature $M''_{Si}$ of the i-th search region Si is defined as the ratio of the sum of the weighted mask value in the search box and the area of the search box, as shown in formula (2):

$$M''_{Si} = \frac{\sum_{(x,y) \in Si} T(x,y)}{w' * h'} \quad (2)$$

In formula (2), $M''_{Si}$ represents the coverage feature of the i-th search region $S_i$, w', h', x and y have the similar definitions as those in formula (1), and T (x,y) represents the weighted mask value of the pixel (x,y) in the search region.

Thus, the value of the coverage feature may be calculated for each search region.

2. Calculation of the Edge Feature

In principle, the edge feature represents the consistence between the search region and the body.

The edge feature may be defined in various manners. In an embodiment of the present invention, the edge feature may be defined according to the gradient projection of the pixel in the search region in a direction. For example, in a preferable embodiment of the present invention, the edge feature may be defined according to the gradient projection of the pixel in the search region in a height direction of the search region. Or, in another preferable embodiment of the present invention, the edge feature may be defined according to the gradient projection of the pixel in the search region in a width direction of the search region.

Figure 5:
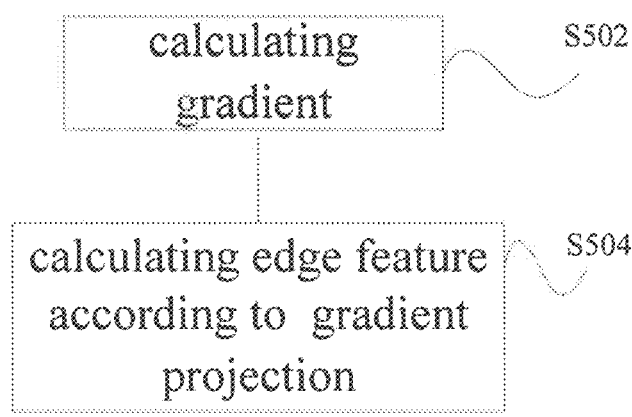
FIG. 5 shows a flow chart for calculating the edge feature according to an embodiment of the present invention.

FIG. 5 shows a flow chart for calculating the edge feature according to an embodiment of the present invention. As shown in FIG. 5, the process for calculating the edge feature includes: a step S502 for calculating the gradient and a step S504 for calculating the edge feature according to the gradient projection.

Firstly, the calculation of the gradient projection is implemented at step S502. For a pixel at the position of (x,y), the horizontal gradient and the vertical gradient are obtained in accordance with the following formula (2) and (3) respectively:

$$g_x(x,y)=d(I(x,y))/dx=I(x+1,y)-I(x,y) \quad (3)$$

$$g_y(x,y)=d(I(x,y))/dy=I(x,y+1)-I(x,y) \quad (4)$$

Particularly, I(x,y), I(x+1,y), I(x,y+1) represent the gray values of pixels at positions of (x,y), (x+1, y) and (x, y+1) respectively. $g_x(x, y)$, $g_y(x, y)$ represent the horizontal gradient and the vertical gradient of the pixel at the position of (x,y). Note that, gradient values of pixels at the image boundary (such as pixels at the position (0,y) or (x,0)) may be set as constant for simplifying the calculation.

Thus, the gradient value and the gradient angle relative to the vertical direction of the pixel at the position of (x,y) are obtained by formulas (5) and (6):

$$\beta(x,y)=\pi/2-\mathrm{arctg}(|gy(x,y)/gx(x,y)|) \quad (5)$$

$$\mathrm{Grad}(x,y)=\sqrt{g_x^2+g_y^2} \quad (6)$$

In formulas (5) and (6), $\beta(x,y)$ and $\mathrm{Grad}(x,y)$ represent the gradient value and the gradient angle relative to the vertical direction of the pixel at the position of (x,y).

After the calculation of the gradient i.e. the calculation of the gradient value and the gradient angle, the edge feature may be obtained according to the gradient projection of the gradient in a direction by using the gradient value and the gradient angle. For example, the edge feature may be calculated according to the gradient projection of the gradient in the height or width direction of the search region.

In a preferable embodiment of the present application, the edge feature may be calculated according to the gradient projection of the gradient in the height direction of the search region. For example, in the case of the rectangle box as shown in FIG. 2a, the edge feature $P'_{Si}$ of the i-th search box Si may be calculated according to the gradient projection of the gradient in the height direction as follows.

$$P'_{Si} = \sum_{(x,y)\in Si} \mathrm{Grad}(x, y) \times \cos(\beta(x, y) - \alpha_i) \quad (7)$$

$$\alpha_i = \frac{\theta}{2} - (i-1) \times \Delta \quad (8)$$

Particularly, $P'_{Si}$ represents the edge feature of the i-th search box, $\alpha_i$ represents an angle between the vertical direction and the height direction of the i-th search box, $\mathrm{Grad}(x, y) \times \cos(\beta(x, y) - \alpha_i)$ represents the gradient projection of the gradient in the height direction of the search box.

As can be seen from formula (7), the edge feature is based on the gradient projection of the gradient in the height direction of the search region. Thus, the more the consistent between the direction of the body and the height direction of the search region is, the small the gradient projection of the gradient in the height direction of the search box is and the small the edge feature $P'_{Si}$ is.

The edge feature as shown in formula (7) is merely an example and the present invention is not limited thereto. The edge feature may also be constituted in other manners. For example, in another preferable embodiment, the edge feature may also be constituted based on the gradient projection of the gradient in the width direction of the search box. Thus, the edge feature is represented as below.

$$P''_{Si} = \sum_{(x,y)\in Si} \mathrm{Grad}(x, y) \times \sin(\beta(x, y) - \alpha_i) \quad (9)$$

As can be seen from formula (9), the more the consistent between the direction of the body and the height direction of the search region is, the larger the gradient projection of the gradient in the width direction of the search box is and the larger the edge feature $P''_{Si}$ is. Additionally, in the formula (9), $P''_{Si}$ represents the edge feature of the i-th search region and symbols in formula (9) have the same meaning as those in formulas (7) and (8) and repeated descriptions are omitted herein.

Thus, the value of the edge feature in each search region may be obtained.

Though in above description, the edge feature is constituted based on the gradient in the whole search region, the edge feature may also be constituted based on the gradient in part of the search region.

Preferably, for example, the search region may be divided into a plurality of sub-region in the longitudinal direction (such as width direction and height direction of the search region), and two longitudinal symmetrical sub-regions (such as two symmetrical sub-regions near the longitudinal boundary of the search region) are selected. Then, the edge feature is calculated in the selected two symmetrical sub-regions. Because the edge feature is calculated in two symmetrical sub-regions near the longitudinal boundary of the search region, the noise caused by clothing may be avoided.

3. The Calculation of the Symmetry Feature

In principle, the symmetry feature represents the symmetry of the image in the search region.

The symmetry feature may be constituted in various manners. In a preferably embodiment of the present invention, the symmetry feature may be calculated based on an image feature (such as the edge feature and the coverage feature) in two longitudinal symmetrical sub-regions as mentioned above. Particularly, the symmetry feature may be calculated according to the sum or difference of the image feature in the two longitudinal symmetrical sub-regions.

Figure 6:
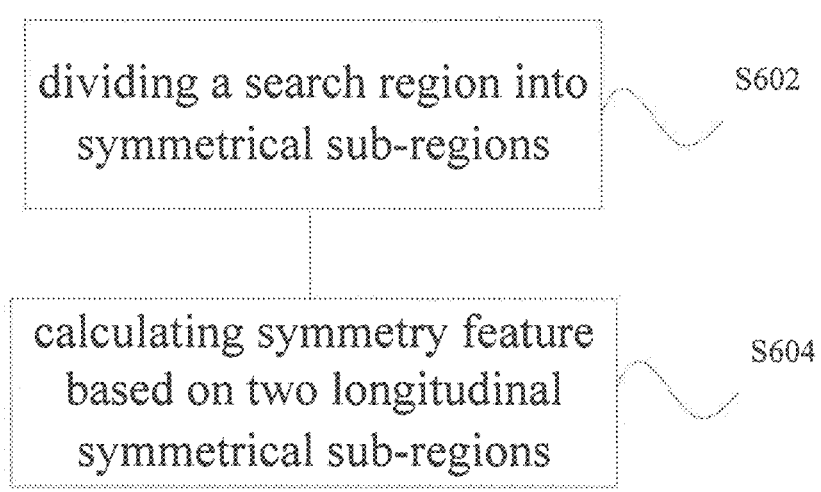
FIG. 6 shows a flow chart for calculating the symmetry feature according to an embodiment of the present invention.

FIG. 6 shows a flow chart for calculating the symmetry feature according to an embodiment of the present invention. As shown in FIG. 6, the process for calculating the symmetry feature includes: a step S602 for dividing a search region into symmetrical sub-regions and a step S604 for calculating the symmetry feature.

Firstly, at step S602, the search region is divided into a plurality of longitudinal symmetrical sub-regions. For example, in the case of the rectangle search box as shown in FIG. 2*a*, the search box Si may be divided into n longitudinal symmetrical sub-regions (n is a natural number greater than 1).

Then, at step S604, two longitudinal symmetrical sub-regions are selected from the plurality of longitudinal symmetrical sub-regions for calculating the symmetry feature.

Any suitable longitudinal symmetrical sub-regions may be selected. For example, the first and the n-th longitudinal symmetrical sub-regions may be selected, or the second and the (n−1)-th longitudinal symmetrical sub-regions may be selected for calculating the symmetry feature. Herein, the division of the search region and the selecting of the longitudinal symmetrical sub-region may be the same as those for calculating the edge feature and repeated descriptions thereof are omitted herein. Additionally, in the case that the edge feature and the symmetry feature are both involved, the division of the search region and the selecting of the longitudinal symmetrical sub-region may be implemented in the same or similar step and the same pair of longitudinal symmetrical sub-regions may be used for the edge feature and the symmetry feature.

The image feature for calculating the symmetry feature may be any suitable image feature such as the above edge feature and the coverage feature. The following description will be given with the edge feature or the coverage feature in the first and the n-th sub-region as an example, however, the present invention is not limited thereto and those skilled in the art can appreciate how to use other image features to calculate the symmetry feature in other sub-regions.

In the case that the symmetry feature is calculated based on the edge feature, any suitable method may be used for calculating the edge feature. Preferably, the above method for calculating the edge feature may be used for calculating the edge features $P'_1$, $P'_n$ in the first and the n-th sub-region. Similarly, in the case that the edge feature and the symmetry feature are both involved, the calculation for the edge feature and calculation for the edge feature of longitudinal symmetrical sub-region may be implemented in the same or similar step. For example, the edge feature of longitudinal symmetrical sub-region may be obtained during the calculation of the edge feature. According to the edge features of two sub-regions, the symmetry feature $Y'_{Si}$ of the i-th search region Si may be defined as:

$$Y'_{Si} = \frac{P'_1 + P'_n}{|P'_1 - P'_n|} \quad (10)$$

As shown from formula (10), the better the symmetry of the image in the search box is, the higher the symmetry feature is.

In the case that the coverage feature is calculated based on the edge feature, any suitable method may be used for calculating the coverage feature. Preferably, the above method for calculating the coverage feature may be used for calculating the coverage features $M'_1$, $M'_n$ in the first and the n-th sub-region. According to the coverage features of two sub-regions, the symmetry feature $Y''_{Si}$ of the i-th search box Si may be defined as:

$$Y''_{Si} = \frac{M'_1 + M'_n}{|M'_1 - M'_n|} \quad (11)$$

As shown from formula (11), the better the symmetry of the image in the search box is, the higher the symmetry feature is.

Thus, the value of the symmetry feature in each search region may be obtained.

The symmetry feature as shown in formulas (10) and (11) are merely examples and the present invention is not limited thereto, and the symmetry feature may also be constituted with other form. For example, those skilled in the art can appreciate that the symmetry feature may be so constructed that, the better the symmetry of the image in the search box is, the lower the symmetry feature is.

Referring to FIG. 3, at step S1062, the energy function may be calculated based on one or more of the above image features.

As stated above, in the case that only one image feature is used for calculating the energy function, the step S106 as shown in FIG. 1 may only include the step 1060 for calculating the image feature.

In addition, in the case that only one image feature is used for calculating the energy function, an image feature may be processed and the used as the energy function. In this situation, the step S106 as shown in FIG. 1 may only include the step 1060 for calculating an image feature and a step 1062 for calculating the energy function based on the image feature.

For example, in the case that only the coverage feature is used, the coverage feature may be used as the energy function directly or be used as the energy function after a reversing process at step S1062. Thus, the search region with the largest or smallest value of the energy function may be determined as the body.

Though only one image feature may be used to calculate the energy function, a plurality of image feature may also be used to construct the energy function so as to improve the accuracy of the calculation.

In the case that a plurality of image feature is used, at step S1062, an energy function may be constructed according to the image features. For example, the energy function may be constructed as a sum of the plurality of image feature or an exponential product of the plurality of image feature. Additionally, the energy function may be so constructed that, the higher the energy function is, the higher the possibility that the search region is the body is. Alternatively, the energy function may also be so constructed that the higher the energy function is, the lower the possibility that the search region is the body is.

In a preferable embodiment of the present invention, the energy function is constructed as an exponential product of the coverage feature and the edge feature.

Particularly, the above energy function constructed as an exponential product of the coverage feature and the edge feature is shown in formula (12).

$$E_{Si} = \exp(-\eta \cdot M''_{Si} + \mu \cdot P'_{Si}) \quad (12)$$

In formula (12), Esi represents the energy function of the i-th search region, $M''_{Si}$ represent the coverage feature of the i-th search region Si as shown in formula (2), $P'_{Si}$ represent the edge feature of the i-th search region Si as shown in formula (7), η and μ represent the weighting factors for the coverage feature and the edge feature respectively. The value of $\eta$ and $\mu$ may be determined empirically.

According to formula (12), the energy function may be calculated for each search region based on the coverage feature as shown in formula (2) and the edge feature as shown in formula (7). As for the energy function as shown in formula (12), the search region with the lowest value of the energy function may be determined as the body.

The energy function may also be constructed with the coverage feature of other form and the edge feature of other form. For example, the energy function may be constructed with the coverage feature as shown in formula (1) and the edge feature as shown in formula (9) as below.

$$E_{Si}=\exp(\eta \cdot M'_{Si} + \mu \cdot P''_{Si}) \quad (13)$$

As for the energy function as shown in formula (13), the search region with the largest value of the energy function may be determined as the body.

In above embodiment, the energy function is calculated with two image features, however, the present invention is not limited thereto and other number of the image features may also be used.

For example, in another preferable embodiment of the present invention, the energy function may also be calculated with the coverage feature, the edge feature and the symmetry feature.

In the case that the coverage feature, the edge feature and the symmetry feature are used, the energy function may be constructed in the form of the exponential product as mentioned above, or be constructed in other forms such as the form of the sum of image features.

As shown in formula (14), the energy function is constructed in the form of the sum of the coverage feature, the edge feature and the symmetry feature.

$$E_{Si}=\eta \cdot M'_{Si} - \mu \cdot P'_{Si} + \lambda \cdot Y'_{Si} \quad (14)$$

In formula (14), Esi represents the energy function of the i-th search region, $M'_{Si}$ represent the coverage feature of the i-th search region Si as shown in formula (1), $P'_{Si}$ represent the edge feature of the i-th search region Si as shown in formula (7), $Y'_{Si}$ represent the symmetry feature of the i-th search region Si as shown in formula (10), $\eta$, $\mu$ and $\lambda$ represent the weighting factors for the coverage feature, the edge feature and the symmetry feature respectively. The value of $\eta$, $\mu$ and $\lambda$ may be determined empirically.

In the energy function as shown in formula (14), the search region with the highest value of the energy function may be determined as the body.

The energy function may also be constructed with coverage feature in other form, edge feature in other form and symmetry feature in other form. For example, the energy function may be constructed with the coverage feature as shown in formula (1), the edge feature as shown in formula (9) and the symmetry feature as shown in formula (11):

$$E_{Si}=\eta \cdot M'_{Si} - \mu \cdot P''_{Si} - \lambda \cdot Y'_{Si} \quad (15)$$

In the energy function as shown in FIG. (15), the search region with the smallest value of the energy function may be determined as the trunk of the body.

As shown in FIG. 1, after the calculation of the energy function, at step S108, a lean angle determination step i.e. a process for using the lean angle of a search region with a largest or smallest value of the energy function as the lean angle of the body is performed.

Particularly, based on the energy function obtained in step S106, a search region with the highest or lowest (depending on the form of the energy function) is determined and is considered as the body. Moreover, the lean angle of the search region is determined as the lean angle of the body.

For example, as for the rectangle box as shown in FIG. 2a, the lean angle of the i-th search box relative to the vertical direction may be obtained with formula (8). Thus, the lean angle of the body may be obtained according the sequence number i of the search box determined as the body in the search box sequence with formula (8).

In above embodiment, the lean angle is relative to the vertical direction, however, the present invention is not limited herein, the lean angle may also be relative to the horizontal direction.

Thus, the lean angle of the body is obtained and the method ends at step S110.

In another embodiment of the present invention, a pose estimation method is provided. In the method, a lean angle of a body is obtained firstly, and then, a pose estimation is performed based on the lean angle of the body.

Figure 7:
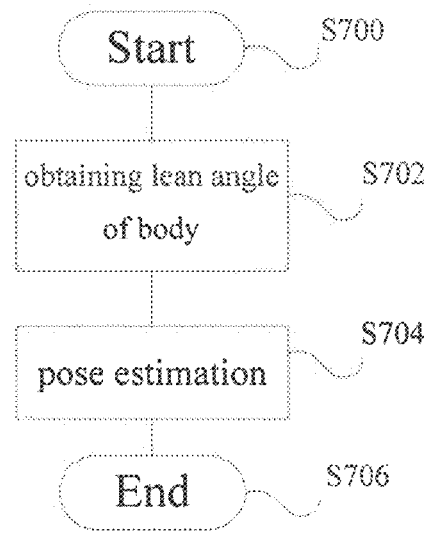
FIG. 7 shows a flow chart of the pose estimation method according to an embodiment of the present invention.

FIG. 7 shows a flow chart of the pose estimation method according to an embodiment of the present invention.

The method starts at step S700.

Then, at step S702, a lean angle of a body is obtained.

There are many suitable methods for obtaining the lean angel of the body.

For example, the lean angle of the body may be input directly.

As an another example, the lean angle of the body may also be obtained via calculation. Preferably, the lean angle of the body may be obtained via the above method for determining the lean angle of the body.

Then, at step S704, the pose estimation is implemented based on the lean angle of the body obtained at step S702.

Any known pose estimation method may be used for implementing the pose estimation. Preferably, the pose estimation method based on model or the pose estimation method based on learning may be used.

For example, in the pose estimation method based on model, the image may be rotated with the lean angle of the body calculated. Then, the rotated image is searched and matched with the body model in the searching space. For example, any one of the pose estimation methods based on model as mentioned above may be used to obtain a pose. Then, the obtained pose is rotated in reverse according to the lean angle of the body and the rotated pose is used as the estimated pose.

As another example, in the pose estimation method based on learning, the image may be rotated with the lean angle of the body calculated. Then, ROI (Region of Interest) image is obtained according to the rotated image. Then, in the ROI image, the pose of the body is obtained according to the contour information of the body. For example, any one of the pose estimation methods based on leaning as mentioned above may be used to obtain the pose. Then, the body pose obtained from the ROI image may be rotated in reverse according to the lean angle of the body and the rotated pose is used as the estimated pose. Thus, the pose estimation is implemented.

Figure 8:
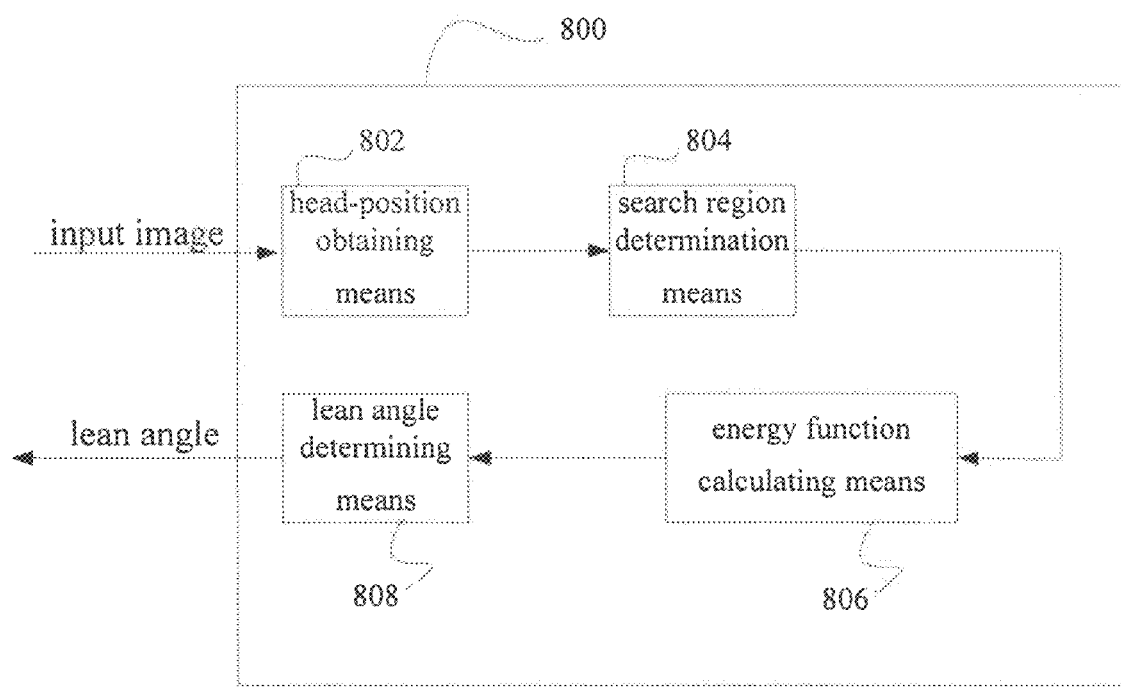
FIG. 8 shows the structure of the device for determining a lean angle of body according to an embodiment of the present invention.

Another embodiment of the present invention further provides a device for determining a lean angle of a body. FIG. 8 shows the structure of the device for determining a lean angle of body according to an embodiment of the present invention. As shown in FIG. 8, the device for determining the lean angle of the body includes a head-position obtaining means 802 adapted to obtain a position of a head; a search region determination means 804 adapted to determine a plurality of search region spaced with an angle around the head; an energy function calculating means 806 adapted to calculate a value of an energy function for the search region; and a lean angle determining means 808 adapted to determine the lean angle of a search region with a largest or smallest value of the energy function as the lean angle of the body.

Particularly, the head-position obtaining means 802 may obtain a position of head. There are various methods for obtaining the head position. For example, the head position may be input directly (not shown in FIG. 8), or, the head position may be obtained via a head recognition process. Preferably, the head position may be obtained by using the method according to the embodiment as show in FIG. 1.

Then, the search region determination means 804 may determine a plurality of search region spaced with an angle around the head. Particularly, the search region determination means 804 may determine a plurality of search region around the head and thus obtain a search region sequence. For example, FIG. 2*a* shows the search regions determined by the search region determination means 804 and the search region is rectangle box in FIG. 2*a*. Preferably, the search regions may be determined by using the method according to the embodiment as show in FIG. 1.

Then, the energy function calculating means 806 may calculate a value of an energy function for each search region determined by the search region determination means 804. Particularly, the energy function calculating means 806 may calculate the value of the energy function for each search region according to one or more image feature. The energy function may be constructed according to any suitable image feature. In an embodiment of the present invention, the energy function calculating means 806 may calculate the energy function according to at least one of the coverage feature, edge feature and symmetry feature.

Figure 9:
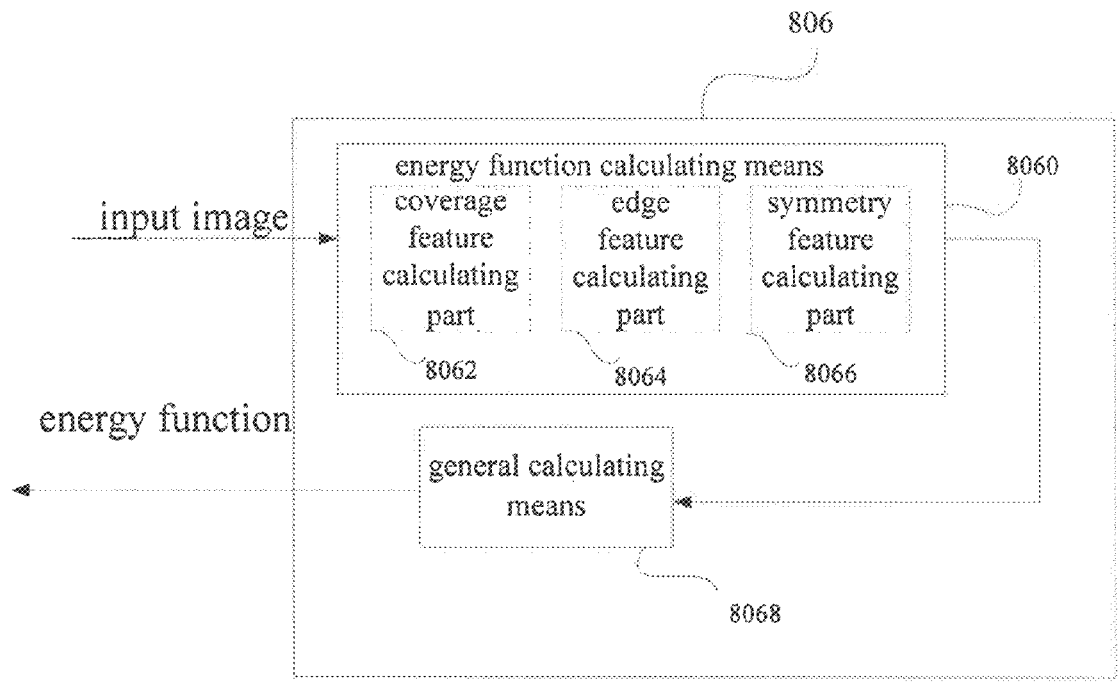
FIG. 9 shows the structure of the energy function calculating means according to an embodiment of the present invention.

FIG. 9 shows the structure of the energy function calculating means 806 according to an embodiment of the present invention. As shown in FIG. 9, the energy function calculating means 806 may include an image feature calculating means 8060 and a general calculating means 8068. Particularly, the image feature calculating means 8060 may calculate at least one of the coverage feature indicating a proportion of foreground pixel in the search region, the edge feature indicating a direction consistency of the search region and the body and the symmetry feature indicating an eudipleural symmetry of image in the search region. The general calculating means 8068 may calculate the value of the energy function based on at least one of the coverage feature, the edge feature and the symmetry feature.

As shown in FIG. 9, according to an embodiment of the present invention, the image feature calculating means 8060 may include a coverage feature calculating part 8062 adapted to calculate a coverage feature, an edge feature calculating part 8064 adapted to calculate an edge feature and a symmetry feature calculating part 8066 adapted to calculate a symmetry feature.

In an embodiment of the present invention, the coverage feature calculating part 8062 may calculate the coverage feature based on the amount of foreground pixels in the search region.

Any suitable method may be used to obtain the amount of the foreground pixels in the search region. For example, the amount of the foreground pixels in the search region may be obtained by counting the foreground pixels in the search region after distinguishing the background pixel and the foreground pixel. As another example, the amount of the foreground pixels in the search region may be obtained with a mask image.

Preferably, the coverage feature may be calculated according the amount of the foreground pixels in the search region and the area of the search region. More preferably, the coverage feature may be calculated according to the amount of the foreground pixels in the search region, the area of the search region and the possibility that the pixel is foreground pixel.

Figure 10:
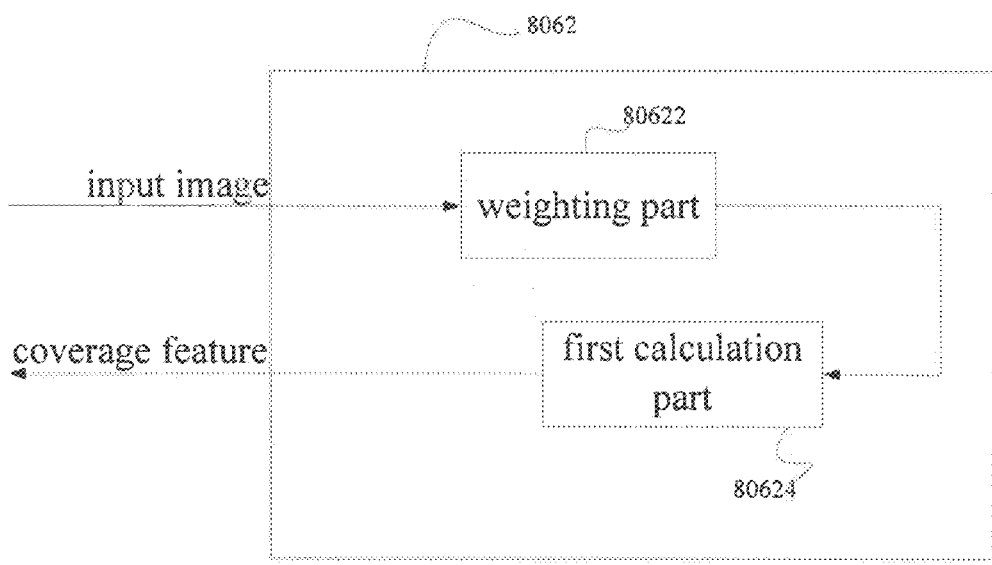
FIG. 10 shows the structure of the coverage feature calculating part adapted to calculate the coverage feature according to an embodiment of the present invention.

FIG. 10 shows the structure of the coverage feature calculating part 8062 adapted to calculate the coverage feature according to an embodiment of the present invention. As shown in FIG. 10, the coverage feature calculating part 8062 may include a weighting part 80622 adapted to weighting the foreground pixel in accordance with a distance between the foreground pixel and background pixel and a first calculation part 80624 adapted to calculate the coverage feature according to weighted mask value. Preferably, the coverage feature may be calculated by using the method according to the embodiment as show in FIG. 4.

In an embodiment of the present invention, the edge feature calculating part 8064 may calculate the edge feature based on a gradient projection of a pixel in the search region in a direction (such as the width direction or height direction of the search region).

Figure 11:
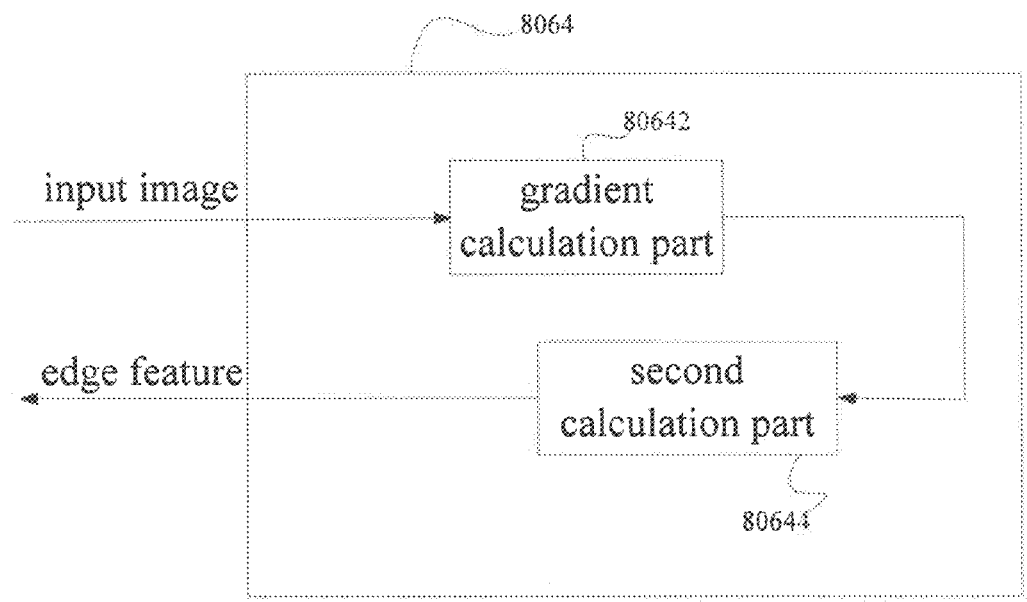
FIG. 11 shows the structure of the edge feature calculating part adapted to calculate the edge feature according to an embodiment of the present invention.

FIG. 11 shows the structure of the edge feature calculating part 8064 adapted to calculate the edge feature according to an embodiment of the present invention. As shown in FIG. 11, the edge feature calculating part 8064 may include a gradient calculation part 80642 adapted to calculate the gradient and a second calculation part 80644 adapted to calculate the edge feature according the projection of gradient of a pixel in the search region in a direction (such as width direction or height direction of the search region).

Particularly, in the operation of the edge feature calculating part 8064, the gradient calculation part 80642 may calculate the gradient for each pixel in the search region. The second calculation part 80644 may calculate the edge feature of the search region according to the gradient projection of the gradient in a direction (for example, width direction or height direction) by using the gradient value and the gradient angle of the gradient. Preferably, the edge feature may be obtained by using the method according to the embodiment as show in FIG. 5.

In an embodiment of the present invention, the symmetry feature calculating part 8066 may calculate the symmetry feature based on an image feature of two longitudinal symmetry portions in the search region.

Any suitable method may be used to calculate the symmetry feature. In an embodiment of the present invention, the symmetry feature calculating part 8066 may calculate the symmetry feature according to an image feature (for example, sum or difference of the image feature) in two longitudinal symmetrical sub-regions.

Figure 12:
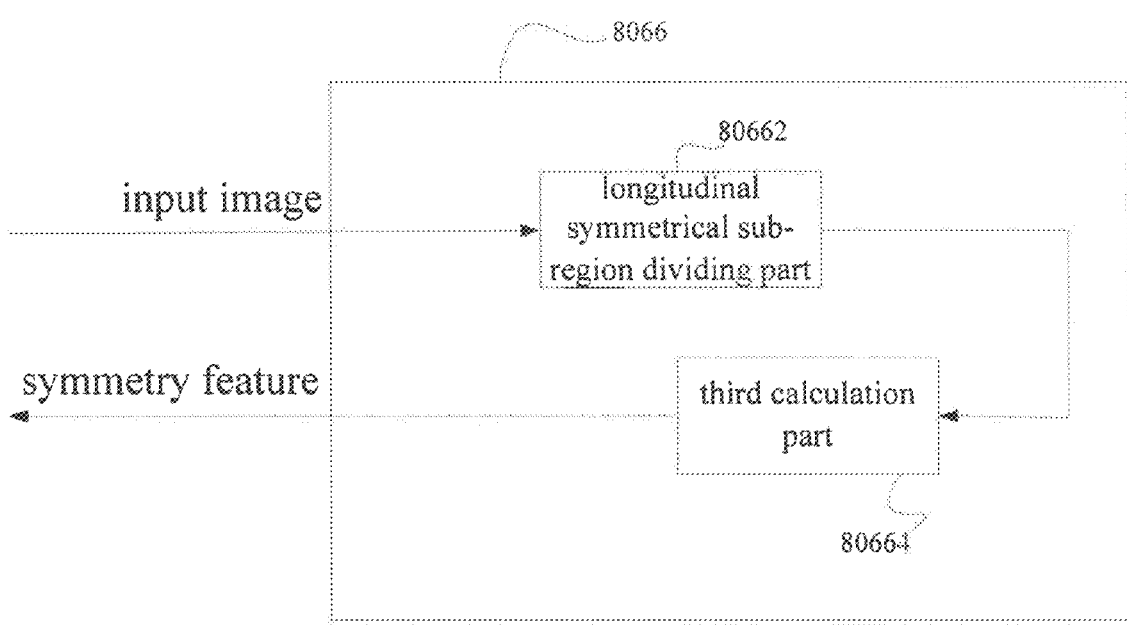
FIG. 12 shows the structure of the symmetry feature calculating part adapted to calculate the symmetry feature according to an embodiment of the present invention.

FIG. 12 shows the structure of the symmetry feature calculating part 8066 adapted to calculate the symmetry feature according to an embodiment of the present invention. As shown in FIG. 12, the symmetry feature calculating part 8066 may include a longitudinal symmetrical sub-region dividing part 80662, adapted to dividing the search region into a plurality of longitudinal symmetrical sub-region, and a third calculation part 80664, adapted to calculate the symmetry feature according to an image feature in two longitudinal symmetrical sub-regions. The image feature may be the coverage feature or edge feature. Preferably, the symmetry feature may be obtained by using the method according to the embodiment as show in FIG. 6.

Referring to claim 8, the lean angle determining means 808 may determine a search region with the highest or lowest (depending on the form of the energy function) as the body and determine the lean angle of the search region as the lean angle of the body.

Figure 13:
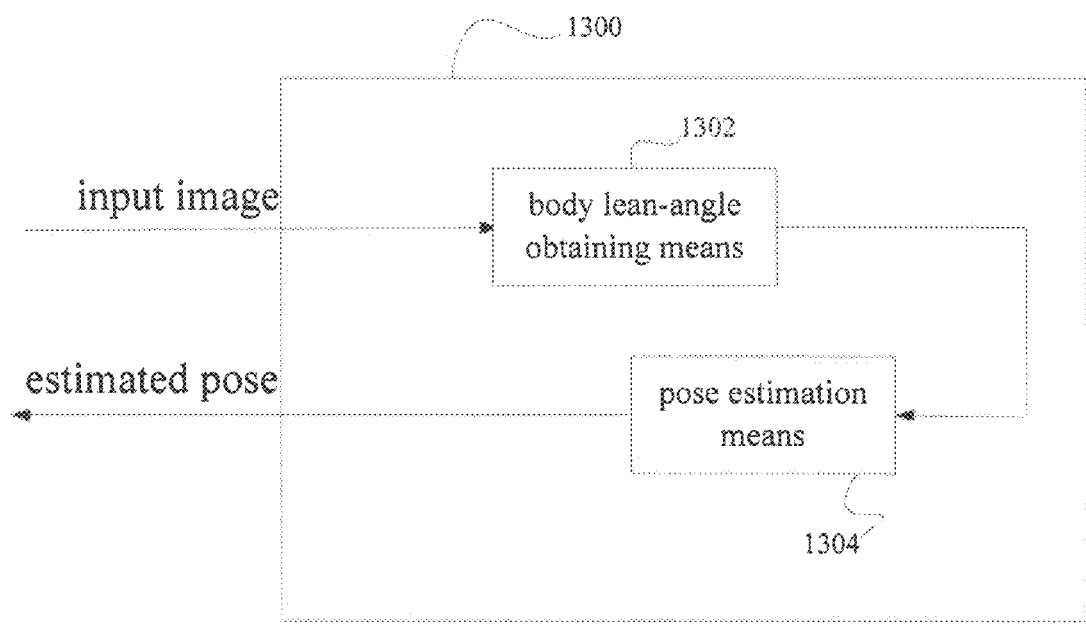
FIG. 13 shows the pose estimation device according to an embodiment of the present invention.

In another embodiment of the present invention, a pose estimation device is provided. FIG. 13 shows the pose estimation device according to the embodiment of the present invention. As shown in FIG. 13, the pose estimation device 1300 includes a body lean-angle obtaining means 1302 adapted to obtain a lean angle of a body and a pose estimation means 1304 adapted to implement a pose estimation based on the lean angle of the body.

The body lean-angle obtaining means 1302 may obtain the lean angle of the body by using any suitable method.

For example, the lean angle of the body may be input directly. As an another example, the lean angle of the body may also be obtained via calculation. Preferably, the lean angle of the body may be obtained via the above method for determining the lean angle of the body. More preferably, the body lean-angle obtaining means 1302 may include the above device 800 for determining the lean angle of the body.

The pose estimation means 1304 may implement the pose estimation based on the lean angle of the body by using any known pose estimation method. Preferably, the pose estimation method based on model or the pose estimation method based on learning may be used. More preferably, the pose estimation may be implemented by using the method according to the embodiment as show in FIG. 7.

In addition, the constituent modules and units of the above mentioned apparatuses according to the embodiments of the present invention can be configured by way of software, hardware, firmware or the combination thereof. The specific means or manners available for the configuration are well known by those skilled in the art, and will not be described here. In the case that the constituent modules and units are implemented by way of software or firmware, a program constituting the software is loaded from a storage medium or a network to a computer having a dedicated hardware structure (such as the general purpose computer 1400 shown in FIG. 14). The computer, when loaded with various programs, can execute various functions.

Figure 14:
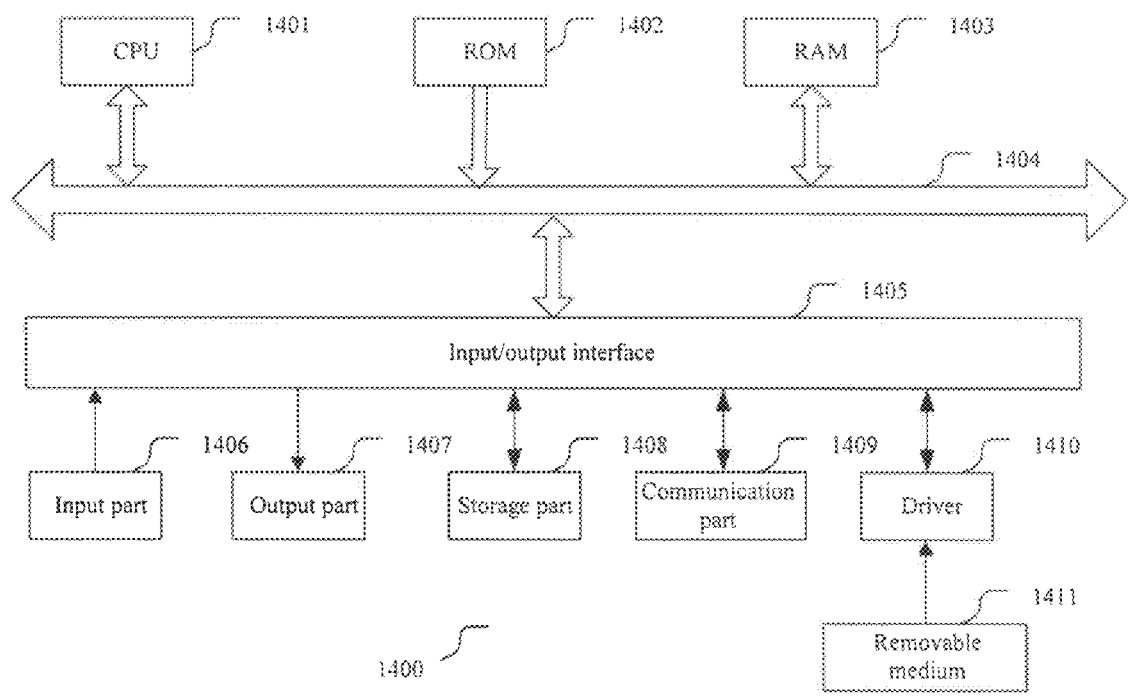
FIG. 14 is a block diagram of a personal computer which is able to implement the method and/or device according to an embodiment of the present invention.

In FIG. 14, a central processing unit (CPU) 1401 executes various processes according to programs stored in a read-only memory (ROM) 1402 or programs loaded from a storage part 1408 to a random access memory (RAM) 1403. Data needed when the CPU 1401 executes various processes are stored in the RAM 1403 as required. The CPU 1401, the ROM 1402 and the RAM 1403 are connected with each other via a bus 1404. An input/output interface 1405 is also connected to the bus 1404.

The following components are connected to the input/output interface 1405: an input part 1406 (including a keyboard, a mouse and etc.), an output part 1407 (including a display such as a cathode-ray tube (CRT) and a liquid crystal display (LCD), and a speaker, etc.), the storage part 1408 (including a hard disk, etc.), and a communication part 1409 (including a network interface card such as an LAN card, a MODEM and etc.). The communication part 1409 executes communication processing via a network such as the Internet. A driver 1410 may also be connected to the input/output interface 1405 as required. A removable medium 1411 such as a magnetic disk, an optical disk, a magneto-optical disk and a semiconductor memory can be installed on the driver 1410 as required, such that the computer program read out therefrom is loaded into the storage part 1408 as required.

In the case that the above series of processes are implemented by software, a program constituting the software is loaded from a network such as the Internet or from a storage medium such as a removable medium 1411.

It is to be understood by those skilled in the art that this kind of storage medium is not limited to the removable medium 1411 storing programs therein and distributing the programs to a user(s) dependently from a device as shown in FIG. 14. Examples of the removable medium 1411 include a magnetic disk (including a Floppy Disk (FD) (registered trademark)), an optical disk (including a CD-ROM and a DVD), a magneto-optical disk (including Microdisk (registered trademark)) and a semiconductor memory. Alternatively, the storage medium can be the ROM 1402, a hard disk contained in the storage part 1408, etc., in which programs are stored and distributed to a user(s) along with a device containing the programs.

The present invention further provides a program product storing machine-readable instruction codes, which, when read and executed by a machine, can execute the methods according to the embodiments of the present invention.

Correspondingly, the storage medium for carrying the program product storing machine-readable instruction codes is also incorporated in the disclosure of the present invention. The storage medium includes, but is not limited to, a flexible disk, an optical disk, a magneto-optical disk, a storage card and a storage stick.

It is to be emphasized that, the term "comprise/include", as used in the present description, refers to the presence of features, elements, steps or components, but does not exclude the presence or addition of one or more other features, elements, steps or components. In addition, without an opposite definition, the term "comprise/include a (an)", as used in the present description does not exclude the presence or addition of one or more other features, elements, steps or components In addition, the methods of the present invention are not limited to being executed in the chronological orders as described in the specification, but can also be executed in other chronological order, in parallel or separately. Therefore, the execution orders of the methods described in the present specification do not constitute limitations to the technical scope of the present invention.

While the present invention is disclosed with reference to descriptions for the specific embodiments of the present invention, it is understood that all of the above mentioned embodiments and examples are illustrative instead of limiting. Those skilled in the art can devise various modifications, improvements or equivalents for the present invention, within the spirit and scope of the appended claims. The modifications, improvements or equivalents should also be considered as being included in the protection scope of the present invention.

What is claimed:

1. A method for determining a lean angle of a body, comprising:
    obtaining a position of a head;
    determining a plurality of search region spaced with an angle around the head;
    calculating a value of an energy function for each search region; and
    determining the lean angle of a search region with a largest or smallest value of the energy function as the lean angle of the body,
    wherein calculating the value of the energy function for each search region comprises:
    calculating a coverage feature indicating an area of foreground pixel in the search region, an edge feature indicating a direction consistency of the search region and the body and a symmetry feature indicating an eudipleural symmetry of image in the search region; and calculating the value of the energy function based on at least one of the coverage feature, the edge feature, and the symmetry feature.

2. The method for determining the lean angle of the body according to claim 1, wherein, the coverage feature is calculated based on the amount of foreground pixels in the search region.

3. The method for determining the lean angle of the body according to claim 2, wherein, when calculating the coverage feature, the amount of the foreground pixels is weighted in accordance with a distance between the foreground pixel and a boundary of foreground pixel and background pixel.

4. The method for determining the lean angle of the body according to claim 1, wherein, the edge feature is calculated based on a gradient projection of a pixel in the search region in a width direction or a height direction of the search region.

5. The method for determining the lean angle of the body according to claim 1, wherein, the symmetry feature is calculated based on an image feature of two vertical longitudinal portions in the search region.

6. The method for determining the lean angle of the body according to claim 5, wherein, the image feature is the coverage feature or the edge feature.

7. A pose estimation method, comprising:
obtaining a lean angle of a body; and
performing a pose estimation based on the lean angle of the body,
wherein, obtaining the lean angle of the body is performed by the method according to claim 1.

8. A non-transitory storage medium, comprising a machine executable program code, when the program code is executed in an information processing device, the program code makes the information processing device execute the method according to claim 1.

9. The method for determining the lean angle of the body according to claim 1, wherein the direction consistency of the search region and the body includes a consistency between a direction of the body and a height or width direction of the search region.

10. A device for determining a lean angle of a body, comprising:
a head-position obtaining means adapted to obtain a position of a head;
a search region determination means adapted to determine a plurality of search region spaced with an angle around the head;
an energy function calculating means adapted to calculate a value of an energy function for the search region; and
a lean angle determining means adapted to determine the lean angle of a search region with a largest or smallest value of the energy function as the lean angle of the body,
wherein the energy function calculating means comprises:
an image feature calculating means comprising a coverage feature calculating part adapted to calculate a coverage feature indicating an area of foreground pixel in the search region, an edge feature calculating part adapted to calculate an edge feature indicating a direction consistency of the search region and the body and a symmetry feature calculating part adapted to calculate a symmetry feature indicating an eudipleural symmetry of image in the search region, and
a general calculating means adapted to calculate the value of the energy function based on at least one of the coverage feature. the edge feature and the symmetry feature.

11. The device for determining the lean angle of the body according to claim 10, wherein, the coverage feature calculating part is adapted to calculate the coverage feature based on the amount of foreground pixels in the search region.

12. The device for determining the lean angle of the body according to claim 11, wherein, the coverage feature calculating part further comprises a weighting part adapted to weighting the amount of the foreground pixels in accordance with a distance between the foreground pixel and a boundary of foreground pixel and background pixel.

13. The device for determining the lean angle of the body according to claim 10, wherein, the edge feature calculating part is adapted to calculate the edge feature based on a gradient projection of a pixel in the search region in a width direction or a height direction of the search region.

14. The device for determining the lean angle of the body according to claim 13, wherein, the symmetry feature calculating part is adapted to calculate the symmetry feature based on an image feature of two longitudinal symmetry portions in the search region.

15. The device for determining the lean angle of the body according to claim 14, wherein, the symmetry feature calculating part is adapted to calculate the symmetry feature based on the coverage feature or the edge feature of two longitudinal symmetry portions in the search region.

16. A pose estimation device, comprising:
a body lean-angle obtaining means adapted to obtain a lean angle of a body; and
a pose estimation means adapted to perform a pose estimation based on the lean angle of the body,.
wherein the body lean-angle obtaining means is the device for determining the lean angle of the body according to claim 10.

17. The device for determining the lean angle of the body according to claim 10, wherein the direction consistency of the search region and the body includes a consistency between a direction of the body and a height or width direction of the search region.

* * * * *